United States Patent [19]
Mucsy et al.

[11] Patent Number: 4,525,661
[45] Date of Patent: Jun. 25, 1985

[54] STAND-BY ELECTRICAL SUPPLY SOURCE

[76] Inventors: Endre Mucsy, Erzsébet k.u.2/c., H-1146 Budapest; Kázmér Hoós, Ráth Gy. u. 22., H-1122 Budapest, both of Hungary

[21] Appl. No.: 375,123

[22] PCT Filed: Sep. 2, 1981

[86] PCT No.: PCT/HU81/00036
§ 371 Date: Apr. 22, 1982
§ 102(e) Date: Apr. 22, 1982

[87] PCT Pub. No.: WO82/00927
PCT Pub. Date: Mar. 18, 1982

[30] Foreign Application Priority Data
Sep. 2, 1980 [HU] Hungary ............... 2159/80

[51] Int. Cl.³ .................... H02K 7/02; H02K 7/18
[52] U.S. Cl. ........................... 322/4; 322/9; 322/40
[58] Field of Search ............ 322/4, 9, 40–43, 322/32; 307/47, 68

[56] References Cited
U.S. PATENT DOCUMENTS

| | | | |
|---|---|---|---|
| 2,900,594 | 8/1959 | Bessiere | 322/40 X |
| 2,998,538 | 8/1961 | O'Mahony | 322/40 X |
| 3,221,172 | 10/1965 | Rolison | 322/9 X |
| 4,439,720 | 3/1984 | Georges | 322/4 |

Primary Examiner—R. J. Hickey
Attorney, Agent, or Firm—Young & Thompson

[57] ABSTRACT

A stand-by electrical energy source for equipment to be operated with substantially continuous current supply, comprising three components one of which is at least one electric rotary machine, another of which is a flywheel and the third of which is an auxiliary energy source. Planetary gearing is provided, comprising a central shaft on which is mounted a sun gear, a planet gear and a ring gear, each of the three components being connected with a respective one of these gears. Two of the three components are interconnected by a drive with an infinitely variable transmission. In one embodiment, the electric rotary machine is connected to the planet gear, the flywheel is connected to the sun gear and the auxiliary energy source is connected with the ring gear. In another embodiment, the electric rotary machine is connected to the sun gear, the flywheel is connected to the ring gear, and the auxiliary energy source is connected to the planet gear.

7 Claims, 23 Drawing Figures

STAND-BY ELECTRICAL SUPPLY SOURCE

The invention relates to a stand-by energy source, in particular to an electric supply source for substantially continuous power supply upon power interruption, comprising one or more electric rotary machines, a flywheel and some kind of an auxiliary energy source, e.g. a heat engine.

In particular in recent years the number of devices, in which energy must be supplied absolutely continuously or with an insignificant break only, has rapidly increased, for example, the operating rooms and intensive care departments of hospitals, telephone centrals, other for telecommunication, control equipment of energy supplying systems, as well as animal husbandry equipment and poultry brooders in agriculture.

In accordance with the fields of application the demands are also of many aspects. Computing centres, e.g. do not allow even the slightest break, on the other hand, in agricultural plants a drop-out of more than 10–20 minutes results in damages. In addition to the permissible duration of the power cut, with the equipments to be supplied the requirements regarding the characteristics of current are also different.

BACKGROUND ART

To meet the different requirements, the most diverse solutions have been developed. Equipment with a higher demand is supplied with energy stored in an accumulator. In case of necessity the voltage is stabilized or transformed to the form needed. This solution is, however, too expensive, in particular, when a high output is required, and when a long-lasting power cut with an infrequent occurrence is to be met in such a manner. The costs of said equipment are further increased by the fact that a continuous maintenance is imperative, at the same time—in spite of the most careful maintenance—the accumulators deteriorate in a few years.

In case of less strict requirements, when a drop-out in the supply from the mains occurs, the operator puts the Diesel-motor of the auxiliary electrical source into operation and in such a manner energy supply may be ensured within some minutes. With this solution there is a considerable break however, the duration of which depends on the reliability and skill of the operator.

In recent years devices have been developed, where the electromotor supplied from the mains performs a steady rotary motion and simultaneously drives the flywheel. In case of a drop-out the engine functions as a generator and supplies energy to the equipment having been separated from the mains, at the same time by the quick locking of a frictional clutch it is connected to the system, whereby the stand-by Diesel-motor is started. According to the relevant publications the Diesel-motor reaches the nominal speed of rotation within a few hundredth seconds and takes over the drive of the generator from the flywheel. The disadvantage of this solution lies in that when locking the clutch, utmost high mechanical stresses arise, accordingly, the equipment endures such "quick starts" to a limited extent only.

DISCLOSURE OF INVENTION

The aim of the invention is to develop the described stand-by energy source in such a manner that the drawbacks could be eliminated, simultaneously—by keeping the advantageous features—further advantages could be achieved.

In accordance with the invention the object is achieved in such a manner that the elements of the stand-by energy source comprising one or more electric rotary machines, flywheel and some kind of an auxiliary energy source, e.g. a heat engine, are engaged with three elements of planetary gearing arranged around a central shaft, furthermore, two of them are interconnected via a further drive with an infinitely variable transmission.

In a preferred embodiment of the stand-by energy source according to the invention the electric rotary machine being connected to the mains, i.e. the electric rotary machine to be supplied and also connected to the mains, e.g. a generator, a pump, is engaged with the carrier arm of the planetary gearing arrangement, the flywheel to one of the central gears, while the auxiliary energy source is coupled to the other central gear. The role of the central gears may be interchanged.

In the stand-by energy source according to the invention the planetary gearing arrangement may be engaged with the other elements in two different ways. One of the modes of engagement lies in that the electric rotary machine being connected to the mains and the machine requiring a continuous drive—e.g. a generator, a pump or a mixer in the chemical industry—is connected to the arm of the planetary gearing arrangement, while the flywheel is engaged with one of the central gears of the planetary gearing arrangement and the auxiliary energy source with the other central gear.

In the other mode of engagement the electric rotary machine having been connected to the mains, i.e. the machine requiring continuous drive, e.g. a generator, a pump or a mixer, is engaged with the central gear of the planetary gearing arrangement, the auxiliary energy source is connected to the arm of the planetary gearing arrangement, while the flywheel engages with the other central gear of the planetary gearing arrangement.

BRIEF DESCRIPTION OF DRAWINGS

The invention will be described in detail by means of some preferred embodiments, by way of example, with reference to the accompanying drawings, wherein.

BEST MODE OF CARRYING OUT THE INVENTION

Figure 1:
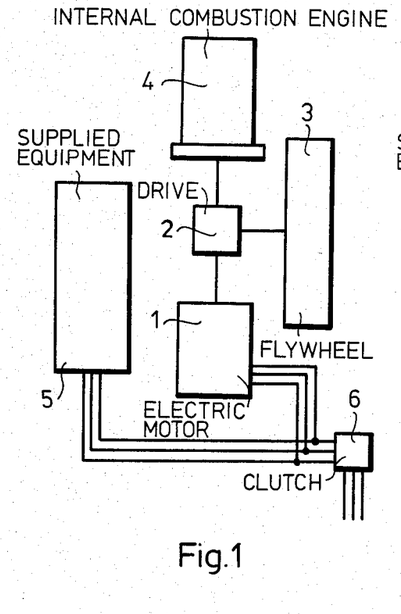
FIG. 1 is a diagram of the fundamental layout of the stand-by energy source according to the invention.

Referring to FIG. 1, is the motor 1 has continuous rotary motion and by the intervention of the drive 2 simultaneously drives a flywheel. The internal combustion engine 4 is connected to the same drive 2, however, whenever energy is supplied from the mains, the engine 4 is in a stationary state. The equipment to be supplied is also connected to the mains. When supply from the mains is stopped, the clutch 6 opens, the motor 1 is transformed into a generator and supplies the equipment 5. Change-over involves voltage drops of a certain extent and duration, the values of which depend on the clutch 6 and on the speed of the control of excitation of the rotary machine 1.

If the equipment 5 does not allow the failure in energy supply resulting from change-over, two electric rotary machines (FIG. 2) are to be incorporated into the equipment in such a manner that co-rotation of the shafts could be achieved. The rotary machine 10 is a motor connected to the mains, while the rotary machine 11 is a generator. In this case the generator 11 is supplying current to the equipment 5, accordingly, when activating the auxiliary energy source, trouble cannot be observed.

Figure 2:
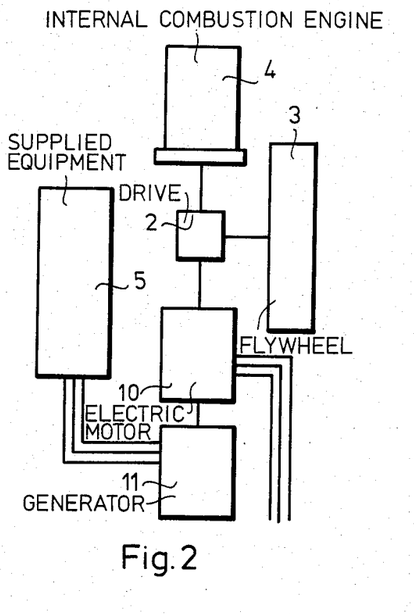
FIG. 2 is showing the schematical diagram of the fundamental layout of another preferred embodiment of the stand-by energy source according to the invention.

When the supply from the mains drops out, the drive 2 drives the rotary machines 10 and 11. At the beginning the energy needed for this purpose is delivered by the flywheel 3, simultaneously with the deceleration of the flywheel 3 the internal combustion engine 4 is gradually accelerated and takes over the energy supply to an ever increasing extent.

In FIGS. 1 and 2 two fundamental solutions serving for continuous current supply are presented. The generator 11 may be replaced by any other machine requiring mechanical driving output, so e.g. a cooler-compressor, a dewatering pump, a mixer used in the chemical industry, etc.

Figures 3A, 3B:
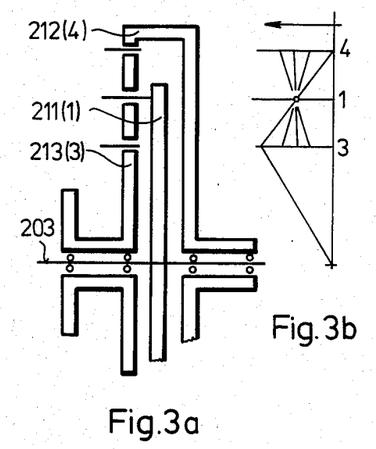
FIG. 3a shows a possible scheme of the planetary gearing arrangement.
FIG. 3b shows the correlations between the velocity vectors.
Figures 4A, 4B:
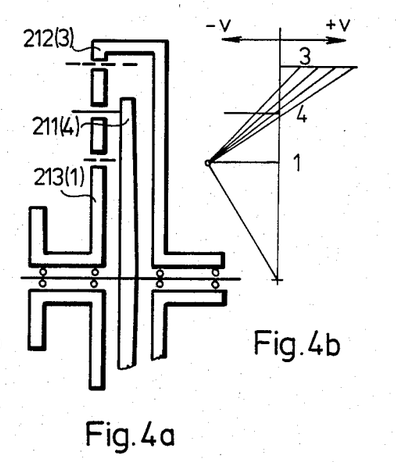
FIG. 4a shows a further possible scheme of the planetary gearing arrangement.
FIG. 4b shows the correlations between the velocity vectors.

Referring to FIGS. 3a and 4a let us examine the manner in which the drive 2 establishes the necessary co-operation between the three shafts being connected to the drive. The drive 2 is a drive with an output branch of planetary gearing arrangement and a drive branch with an infinitely variable transmission. For this solution a bivariant planetary gearing arrangement is needed, which means that out of the three main elements—the arm, the sun gear and the ring gear—two may rotate with an optional speed of rotation, while the speed of rotation of the third element develops in dependence of that of the other two.

In FIG. 3a one of the known planetary arrangements is to be seen, which can be advantageously used in the stand-by energy source according to the invention. The carrier arm 211 co-rotates with the shaft 203. The internal ring gear 212 and the external sun gear 213—supported in bearings—rotate on the same shaft. The planet pinion supported in bearings on the arm 211 is engaged with the teeth of these two central gears.

In FIG. 3b the peripheral velocity vectors of the three elements of the planetary gearing arrangement are illustrated in several modes of operation, when all the three elements are rotating counter-clockwise and with different peripheral velocities. From two known peripheral velocities the third one can be calculated, since the end-points of the three velocity vectors always lie on one straight line.

From FIG. 3b it becomes obvious that when the arm 211 is rotating with a constant velocity, the peripheral velocity of the two central gears can be chosen within wide limits, in fact, one of them might be even at a standstill and this led us to the fundamental idea of the invention: if the electric rotary machines 10 and 11 are connected to the arm 211 of the planetary gearing arrangement (FIG. 3a) of the drive 2 (FIG. 2) and to one of the central gears, e.g. to the sun gear 213 the flywheel, and to the ring gear 212 the internal combustion motor is connected—the two latter ones can be interchanged—it becomes possible to leave the internal combustion engine 4 in a stand-by state, i.e. it does not rotate, and the motor 1 or 10 drives the flywheel via the planetary gearing arrangement.

In FIG. 4a and in the corresponding vector-FIG. 4a another mode for the interconnection of the planetary gearing arrangement according to FIG. 3a is to be seen. Wherein the ring gear 212 is engaged with the flywheel 3, the arm 211 with the auxiliary energy source 4 and the sun gear 213 engages with the motor-generator 1 of the mains. Taking into consideration that in this case the sense of rotation of the ring gear 212 connected to the flywheel is opposite to the sense of rotation of the other two elements of the planetary gearing arrangement, the angular velocity—and as a consequence, the abrasion—will be high. The connection shown in FIGS. 3a and 3b are to be considered as more advantageous, and so in the further embodiments this type of connection will be used.

In FIGS. 3a and 4a, in addition to the reference numerals of the elements, the symbols of the units, to which they are connected, are also indicated in brackets. In FIGS. 3b and 4b the symbols of the same units are to be found beside the peripheral velocity vectors of the corresponding elements.

As we have already mentioned before, the speed of rotation of two out of the three elements of the planetary gearing arrangement determines the speed of the third one. In the stand-by condition this connection can be established in a very easy manner, in so far as the internal combustion engine is braked; in this case the speed of rotation of the flywheel is proportional to the speed of rotation of the motor 1. The connection becomes more complicated when the central energy supply is stopped and the brake is released. In this case the generator 10 or 11 generated the electric energy needed, but for this purpose the generator has to be rotated. At the beginning only the energy that has been stored in the flywheel is available, as the internal combustion engine 4 is in a stationary state. When the flywheel is transmitting the energy, the speed of rotation decreases, accordingly, the constant speed of rotation of the generator can be ensured only by increasing the speed of rotation of the internal combustion engine, which means that the flywheel has to rotate, i.e. to accelerate the internal combustion engine in addition to the generator.

Above a certain speed of rotation the internal combustion engine also transmits an output, increasing approximately in proportion with the increase of the speed of rotation. However, realization becomes possible when two out of the three elements of the planetary gearing arrangement (i.e. the generator connected to them), the flywheel and the internal combustion engine are engaged with an output-transmitting connection with an infinitely variable transmission.

Three kinds of coupling are possible:
1. The flywheel is coupled with the internal combustion engine,
2. the flywheel is coupled to the generator,
3. the generator is coupled with the internal combustion engine.

Of these three cases the second case differs essentially from the other two, since here an infinitely variable transmission, hereinafter called a variator, has been established between two elements, which are rotating even in the stand-by state, accordingly, for this purpose a drive with a slight possibility for modification, e.g. a variator with V-belts, suffices.

In cases 1 and 2, the internal combustion engine in the stand-by state is to be accelerated to the desired speed of rotation in an infinitely variable manner, however, by using a variator with V-belts, acceleration in such a manner cannot be performed.

Figures 5A, 5B, 5C:
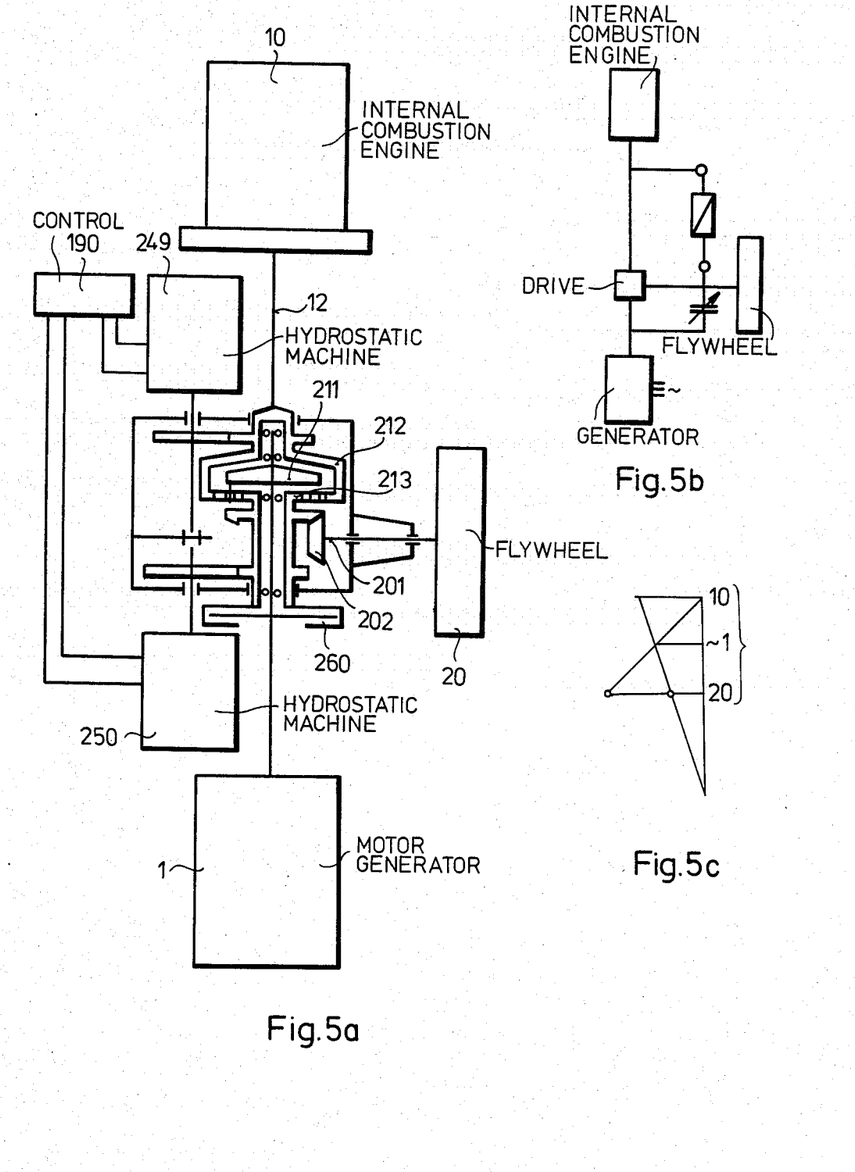
FIG. 5a illustrates the kinematic scheme of a preferred embodiment.
FIG. 5b is the schematic diagram of the embodiment according to FIG. 5.
FIG. 5c illustrates the correlation between the velocity vectors.

The essence of the embodiment to be seen in FIG. 5a lies in that the three-phase motor-generator 1 is rotating with a constant conditions, with a speed of rotation in compliance with the voltage and frequency of the mains. If it is a synchronous generator, by excitation, i.e. by the control thereof it can be well used for phase correction. Accordingly, in the stand-by state the motor-generator 1 and the flywheel 20 with the shaft 201 are rotating. In this case the auxiliary energy source is represented by the internal combustion engine 10, but it may be any other power source, e.g. a gas turbine. The internal combustion engine 10—being in a stand-by state, i.e. it does not rotate—is connected via its output shaft 12 to the ring gear 212 of the planetary gearing arrangement. The motor-generator 1 is connected to the arm 211 of the planetary gearing arrangement, while the flywheel 20 engages with the sun gear 213 of the planetary gearing arrangement via a pair of bevel gears 202 wedged onto the shaft 201. Between the sun gear 213 and the ring gear 212 a drive containing the hydrostatic rotary machines 249, 250 with a variable piston displacement are imposed, as a drive branch with an infinitely variable transmission ratio. In the case of equipment with a higher output the infinitely variable drive should be established with electric rotary machines, By this arrangement it becomes possible that in a stationary position of the internal combustion engine 10 the stand-by energy source should remain available in such a manner that the motor-generator 1, when working as a motor, should keep the flywheel in a "charged" i.e. in a rotary state. In this situation the piston displacement of the rotary machine 250 equals zero, while the rotary machine 219 is fixed by means of the control organ 190.

In case the voltage of the mains dropped out or ceased completely for any reason, the piston displacement of the rotary machine is to be increased gradually, whereby the shaft of the internal combustion motor 10 begins to rotate with a gradually increasing speed of rotation. After having reached the permissible lowest speed of rotation, the internal combustion motor is ignited and from that moment it takes part in the energy supply of the system. When the output of the internal combustion engine 10 reaches or surpasses the power demand under load of the motor-generator 1, the speed of rotation of the motor in accordance with the changed load, the power demand under the provisional conditions is satisfied by means of the flywheel, while the surplus is fed therein. Between the arm 211 and the sun gear 213 of the planetary gearing arrangement there is a frictional clutch 260; when the clutch is locked, the operation of the equipment is similar to that of the traditional motor-generator set driven by an internal combustion engine.

Figure 6A:
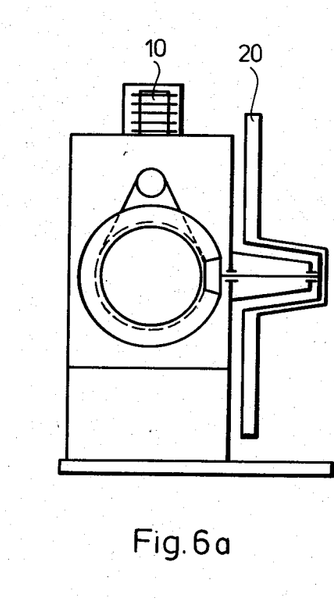
FIG. 6a is the front view of a further embodiment.
Figure 6B:
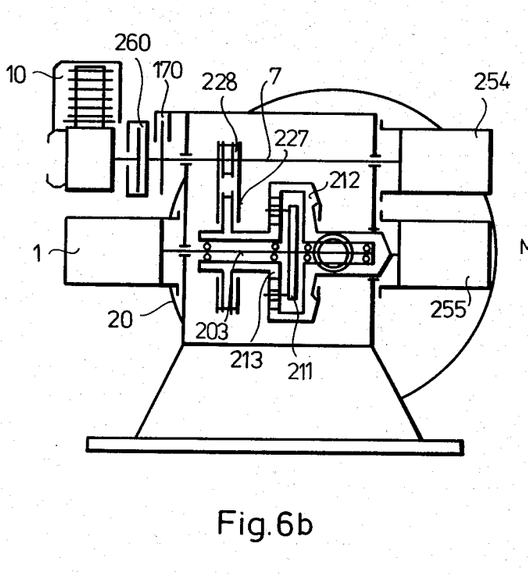
FIG. 6b is the kinematic diagram of the embodiment according to FIG. 6.
Figure 6C:
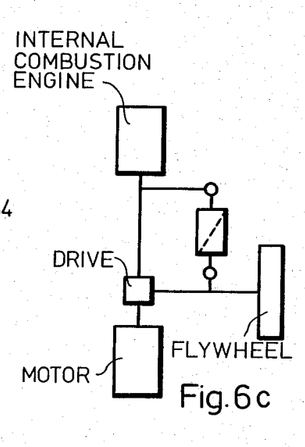
FIG. 6c is the schematic diagram of FIG. 6.
Figure 6D:
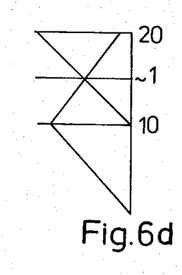
FIG. 6d shows the correlations between the velocity vectors.

Referring to the embodiment to be seen in FIGS. 6a, 6b and 6c, the object of this embodiment is to satisfy simultaneously the requirements relating to minimal maintenance, long useful life, small space requirement and easy accomodation.

The motor generator 1 supplied from the mains is arranged on the left end of the shaft 203. The ring gear 212 rotates around the shaft 203; the electric rotary machine 255 and the flywheel 20 (via the bevel gears) are engaged with the ring gear. The sun gear 213, supported in bearings in the shaft 203, is connected by means of a Gall's chain 227 to the sprocket wheel 228 wedged onto the shaft 7, as is to be seen in the figure. On the right side the electric rotary machine 254 is connected to the shaft 7, while on the left side the disc brake 170, the frictional clutch 260 and the internal combustion engine 10 are arranged.

In order to be able to prolong the useful life of the equipment the components, which are continuously in rotary motion—even in the stand-by state—should rotate as slowly as possible. The speed of rotation of the motor-generator 1 supplied from the mains should not be more than 1000–750 rpm, in such a manner the speed of rotation of the rotary machine 255 will be also relatively low, about 1200–1500 rpm.

The electric rotary machines 254 and 255 can be D.C. machines, in this case it seems to be expedient to raise the brushes of the rotary machine in the stand-by state. It is considered as a best solution to apply A.C. machines without sliding surfaces and to insert a controlled reversing switch—a frequency changer—between said machines.

The peripheral velocities and the correlations between the speeds of rotation may be read out from the part-figure, FIG. 6c, on the right side. In a stand-by state the motor-generator 1 supplied from the mains is rotating, the brake 170 is locked and the clutch is released. The rotary machine 254 is at standstill, the rotary machine 255 is rotating in an unloaded state, the flywheel 20 is also rotating.

When the energy supply from the mains drops out, by changing the excitation the motor 1 is transformed into a generator and by utilizing the current having been generated by the rotary machine 255, it starts the rotary machine 254. The flywheel 20 is slowing down and transmits the energy; by the acceleration of the rotary machine 254 the generator can be kept at a constant speed of rotation.

Figures 7A, 7B, 7C:
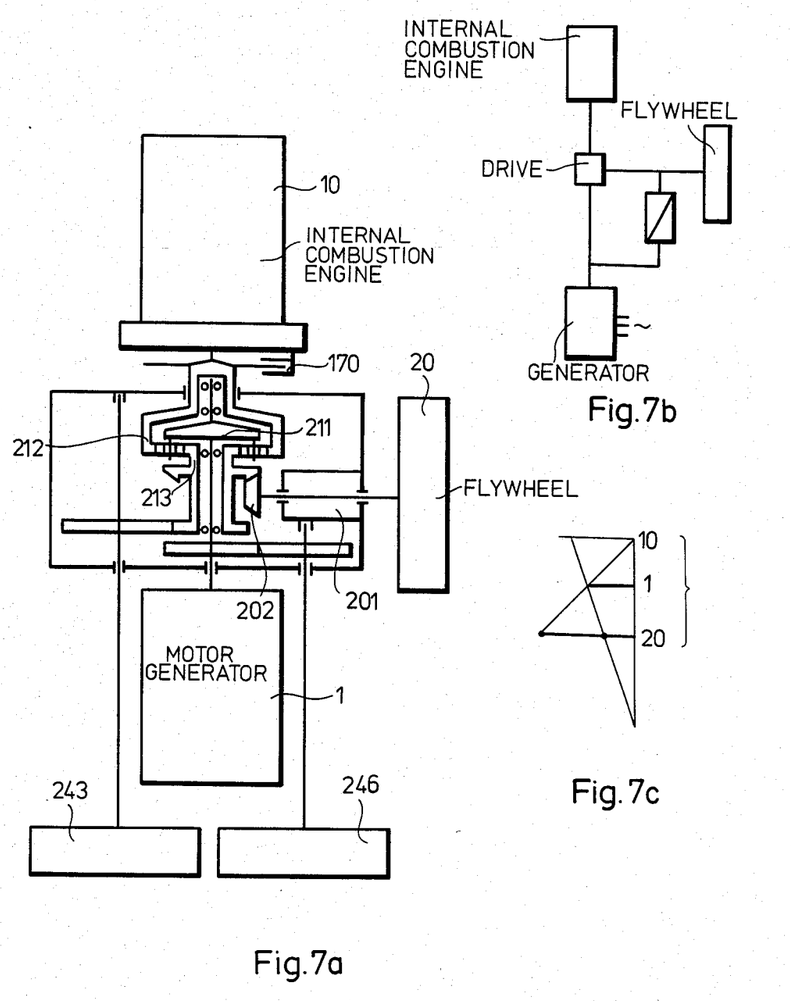
FIG. 7a is the kinematic diagram of a preferred embodiment.
FIG. 7b is the schematic diagram of the embodiment according to FIG. 7.
FIG. 7c illustrates the correlations between the velocity vectors.

Now, referring to FIG. 7a, here a stand-by energy source essentially similar to the embodiment according to FIG. 5a may be seen. The difference lies in that in the infinitely variable drive branch of the planetary gearing arrangement, in the output branch a variator with V-belts is used. The output to be gained by means of the equipment is restricted to about 10–30 kW by the dimension of the V-belt.

Since by means of the variator with V-belts transmission in such a form that one pulley is at standstill and the other rotates cannot be realized, an essential difference lies in that in this embodiment the variator provided with the V-belts establishes a driving connection with an infinitely variable transmission between the arm 211 and the sun gear 213 of the planetary gearing arrangement. Accordingly, the the embodiment to FIG. 7a, the internal combustion engine 10, used as an auxiliary energy source, can be stopped, however, it seems to be expedient to promote braking by using an accessory frictional brake 70, i.e. to ensure the stationary state thereof, because in such a manner it becomes possible to loosen temporarily the V-belts.

Figures 8A, 8B:
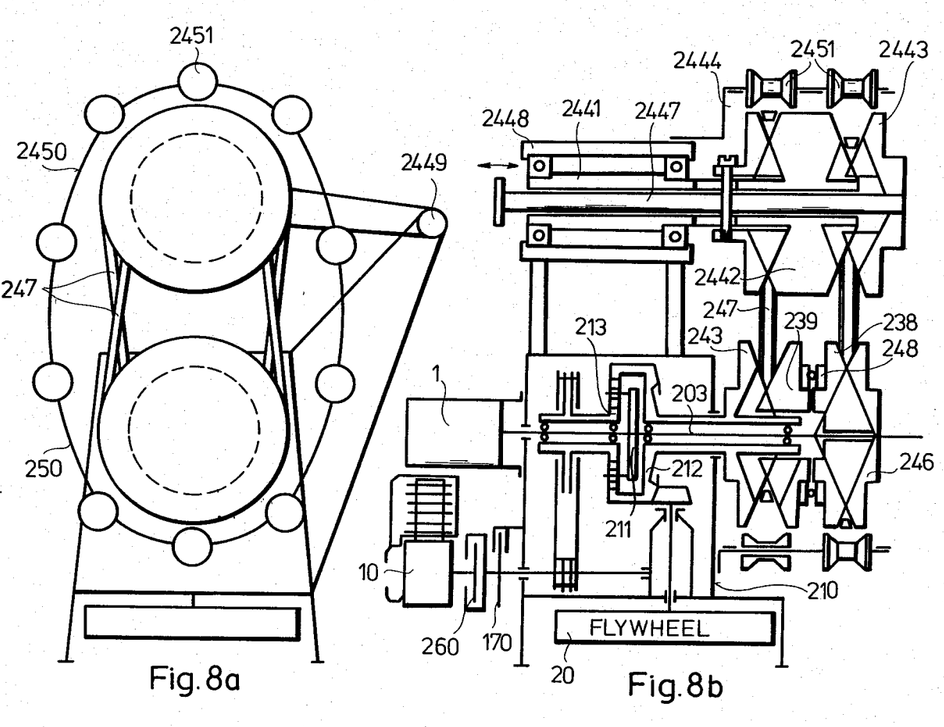
FIG. 8a is the front view of an improved embodiment.
FIG. 8b is the side view of the embodiment according to FIG. 8.
Figure 8C:
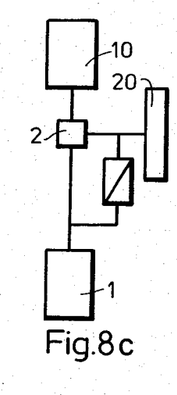
FIG. 8c is a schematical diagram.
Figure 8D:
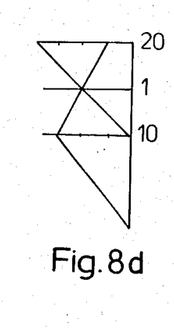
FIG. 8d shows the correlations between the velocity vectors.

In FIGS. 8a, 8b and 8c and embodiment is shown, wherein the resilient drive-transmitting element of the variator, the endless driving belt can be stopped in the stand-by state, thus prolonging the useful life. With this embodiment the flywheel 20 is engaged with the ring gear 212 of the planetary gearing arrangement, while the auxiliary energy source—in the present case an internal combustion engine 10—is connected to the sun gear 213 of the planetary gearing arrangement by interposing the releasable safety clutch 260 and the frictional brake 170. Between the ring gear 212 and the arm 211 a variator provided with two V-belts 247 connected in series, with an infinitely variable transmission, is inserted.

In order to be able to stop the drive belt, the outer half-discs 243, 246 of the V-belt pulleys, which are on the geometric axis of the planetary gearing arrangement are wedged on the tubular shaft co-rotating with the ring gear 212, i.e. they are wedged onto the shaft 203 of the arm 211; the inner half-discs 238 and 239 are supported in bearings and co-rotate with said shafts but can be axially displaced thereon and between them the thrust bearing 248 is arranged. The inner half-discs 2442 of the other two V-belt pulleys are wedged onto the tubular countershaft 2441, while the outer half-discs 2443 and 2444 are fixed to the axially displaceable bar 2447 arranged in the inside of the tubular counter-shaft 2441. The distance of the bearing block 2448 of said tubular countershaft 2441 in relation to the geometric axis of the planetary gearing arrangement can be changed by turning-off around the hinging point 2449. The V-belts 247 are enclosed by the metal sheeting 2450 consisting of two halves; the sheeting comprises the freely rotating guide elements 2451 and one half thereof is fastened to the housing 210 of the planetary gearing arrangement, while the other half is fixed to the bearing block 2448 of the tubular countershaft 2441.

The variator with the two V-belts 247 connected in series can be modified by the axial displacement of the bar 2447. In the position of the variator shown in FIG. 8a the bar 2447, as well as the discs 2443, 2444 and the half-discs 238, 239 are in their right-hand end position. As a consequence, the sun gear 213 and the connected auxiliary energy source 10 are at a standstill. The tightness of the V-belts 247 can be changed by turning the bearing block 2448 around the hinging point 2449. In the stand-by state, after having locked the brake 170 the bearing block 2448 approximates the shaft 203 of the planetary gear arrangement to such an extent that should the V-belts 247 leave the frictional surface of the pulleys and bear against the guide elements 2451 of the metal sheeting 2450, they would gradually stop. In such a manner their useful life can be considerably prolonged.

Figures 9A, 9B, 9C:
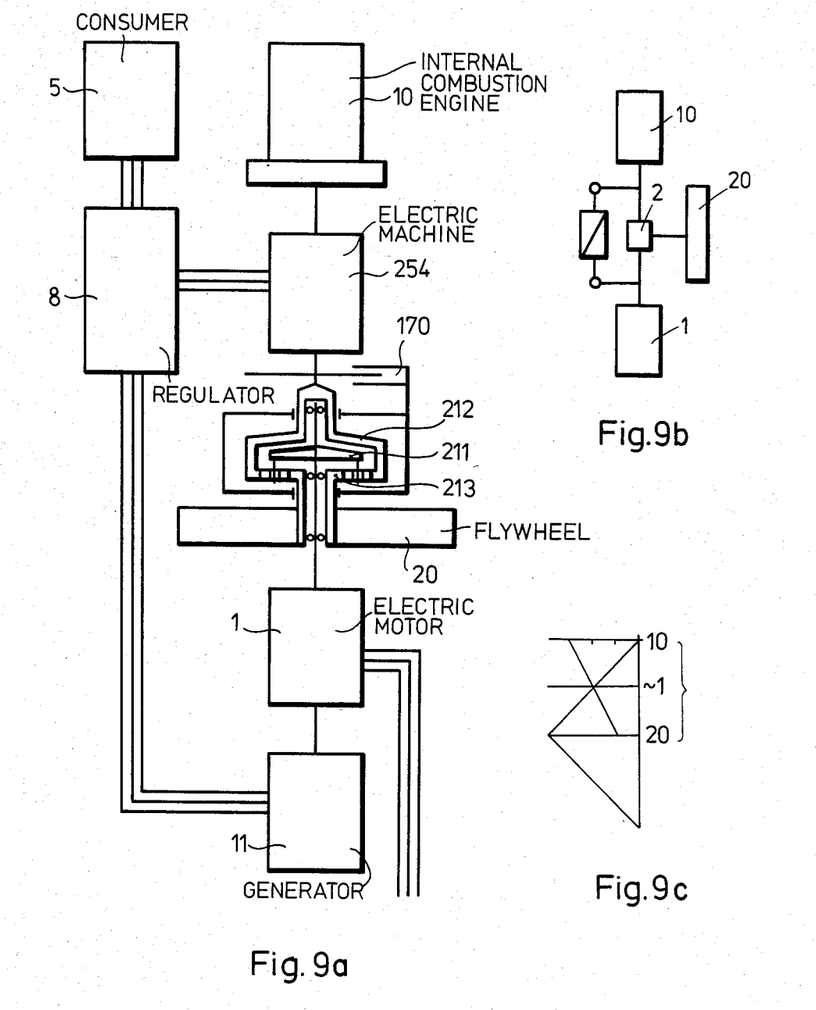
FIG. 9a is the kinematic diagram of a preferred embodiment.
FIG. 9b is a schematical diagram of FIG. 9.
FIG. 9c illustrates the correlations between the velocity vectors.

In the embodiment shown in FIG. 9a the flywheel 20 engages with the sun gear 213 of the planetary gearing arrangement, while the internal combustion engine 10 is connected via the electric rotary machine 254 to the ring gear 212. The machine 11 requiring continuous drive, the electric rotary machine 254, as well as the consumer requiring uninterrupted energy supply, are electrically interconnected by means of the switching—controlling and regulating unit 8. The ring gear 212 is engaged with the frictional brake 170.

From FIGS. 9a and 9b it becomes evident that this embodiment embodies the schematic arrangement according to FIG. 2, in contrast to the previously described examples, in which the schematic arrangement according to FIG. 1 is embodied.

The advantage of the embodiment according to FIG. 9a lies in that the structural layout is simple, the drive branch with the infinitely variable transmission is realized by means of the electric rotary machines 11 and 254, which supply also the consumer 5 with current via the switching-controlling and regulating unit 8.

We claim:

1. A stand-by electrical energy source for equipment to be operated with substantially continuous current supply, comprising three components one of which is at least one electric rotary machine, another of which is a flywheel and the third of which is an auxiliary energy source, planetary gearing comprising a central shaft on which is mounted a sun gear, a planet gear and a ring gear, each of said components being connected with a respective one of said gears, two of said components being interconnected by means of a drive with as infinitely variable transmission.

2. An energy source as claimed in claim 1, in which said electric rotary machine is connected to said planet gear, said flywheel is connected to said sun gear and said auxiliary energy source is connected with said ring gear.

3. An energy source as claimed in claim 1, in which said electric rotary machine is connected to said sun gear, said flywheel is connected to said ring gear, and said auxiliary energy source is connected to said planet gear.

4. An energy source as claimed in claim 2, in which said infinitely variable transmission comprises hydrostatic rotary machines with a variable piston displacement control means between said hydrostatic rotary machines, and a frictional clutch between said planet gear and said sun gear.

5. An energy source as claimed in claim 1, in which the flywheel is connected to the ring gear, the auxiliary energy source is connected to the sun gear, the infinitely variable transmission is disposed between the sun gear and the ring gear and is comprised by electrical rotary machines, and a brake for the sun gear.

6. An energy source as claimed in claim 2, in which said infinitely variable transmission is disposed between said sun gear and said planet gear, and a frictional brake for said ring gear.

7. An energy source as claimed in claim 1, in which the flywheel is engaged with the ring gear, a releasable safety clutch and a frictional brake by which the auxiliary energy source is connected to the sun gear, the infinitely variable transmission interconnecting the ring gear and the planet gear.

* * * * *